(12) United States Patent
Dawson et al.

(10) Patent No.: US 8,221,078 B2
(45) Date of Patent: Jul. 17, 2012

(54) METHODS AND SYSTEM FOR PROVIDING POWER AND SIGNALS IN A TURBINE

(75) Inventors: Mark Dawson, Boise, ID (US); Jack Wallace, Yucaipa, CA (US)

(73) Assignee: Frontier Wind, LLC, West Conshohocken, PA (US)

( * ) Notice: Subject to any disclaimer, the term of this patent is extended or adjusted under 35 U.S.C. 154(b) by 504 days.

(21) Appl. No.: 12/424,180

(22) Filed: Apr. 15, 2009

(65) Prior Publication Data
US 2010/0266408 A1   Oct. 21, 2010

(51) Int. Cl.
*B63H 1/06* (2006.01)
(52) U.S. Cl. ...................................... 416/87; 416/219 R
(58) Field of Classification Search .................... 416/87, 416/88, 89, 98, 101, 130, 206, 218
See application file for complete search history.

(56) References Cited

U.S. PATENT DOCUMENTS

| 2003/0223868 A1* | 12/2003 | Dawson et al. ................ 416/1 |
| 2009/0304507 A1* | 12/2009 | Dehlsen ........................ 416/87 |

FOREIGN PATENT DOCUMENTS
EP           1500815 A  *  1/2005

* cited by examiner

*Primary Examiner* — Cheung Lee
(74) *Attorney, Agent, or Firm* — Banner & Witcoff, Ltd.

(57) ABSTRACT

Power and signals may be transmitted from a root portion of an extendable rotor blade to a moving tip portion using a slide block and a slide channel. The slide block is configured to fit within the slide channel and includes a conductive element that comes into contact with a conductive element of the slide channel. The tip portion may be attached to the slide block such that as the slide block moves along the slide channel, the tip portion is extended or retracted accordingly. The conductive elements may be fixed within each of the slide block and slide channel so that when the tip portion is retracted or extended, the conductive elements do not move.

17 Claims, 7 Drawing Sheets

METHODS AND SYSTEM FOR PROVIDING POWER AND SIGNALS IN A TURBINE

TECHNICAL FIELD

The invention relates to the design and control of a wind turbine. Specifically the invention relates to methods of bringing power to portions of a variable length blade.

BACKGROUND

Wind turbines create power proportional to the swept area of their blades. Increasing the length of a wind turbine's blades increases the swept area, which produces more power. A wind turbine's generator, gears, bearings, and support structure must be designed around the expected wind load and power production. At low wind speeds very long blades are desirable to get as much power as possible out of the available wind. At high wind speeds a wind turbine must control the power production and the mechanical loads developed. Eventually, if the wind speeds become high enough, the turbine must shut down to avoid damaging components, so short blades are desirable to keep the turbine producing power in high winds.

The choice of a rotor diameter for a wind turbine is a design trade-off between energy production in low winds and load limitation in high winds. Wind turbine manufacturers often sell a variety of rotor sizes for a given wind turbine model. The rotor sizes are optimized for sites that have a low, medium, or high annual average wind speed. However, the rotor size selected is always a compromise, and there are conditions in which the turbine does not perform optimally because the rotor is too big or too small.

Disclosed in U.S. Pat. No. 6,902,370 is a variable length wind turbine blade that allows for a large diameter in low winds and a small diameter in high winds. This is accomplished by having a root portion and a tip portion of the blades. The tip portion may be extended or retracted, depending on the amount of wind present.

To adjust the length of the blade and sense certain variables, there may be sensors and drives located on the tip portion of the blade, and these sensors must have power and control signals. A standard method of sending power and signals is to run wires. Running wires would be less than ideal because of the varied length of the distance between any point on the radially stationary part of a rotor and the radially varying blade tip portions. Wires long enough to reach when the tip portion is extended would slacken and get in the way when the tip portion is retracted. Having slack wires moving about in the blade causes unusual stress on the wires and the potential for the wires to be caught in other moving parts.

It would be advantageous to have a method of running power and control signals to a tip portion of a wind turbine blade in a manner that is adjustable depending on the degree of extension in the tip portion.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects described herein provide a wind turbine blade that is variable in length, in order to change the rotor's cross-sectional swept area and to regulate the amount of power intercepted from the wind. In low wind conditions, the blade length may be extended to provide a rotor with maximum swept area so that the maximum amount of power can be extracted from the wind. In high wind conditions, the blade is retracted to minimize aerodynamic loading and to keep structural loads within the design criteria.

The variable length blade may include a root portion and a tip portion. The tip portion is longitudinally moveable relative to the root portion. As the tip portion is moved longitudinally, the effective length of the blade may be varied.

According to another aspect, a slide block may run along an outer edge of an extendable tip portion. The slide block may include conductors that are configured to connect to elements requiring power and or signals on the tip portion. The slide block may moves through a slide channel affixed to the root portion. The slide block and the slide channel may each include conductive strips providing a conduit through which power and signals may be transferred. In this manner, there are no wires that slacken during retraction, allowing them to become caught or otherwise damaged. The components described herein may, in some arrangements, be fixed to and/or integrated with the root and tip portions of the blade, eliminating wires that might ordinarily extend and retract with the movement of the root or tip portions. Such configurations allow power and signals to be transferred between the root and tip portions of the variable length blade in a safe and durable manner.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
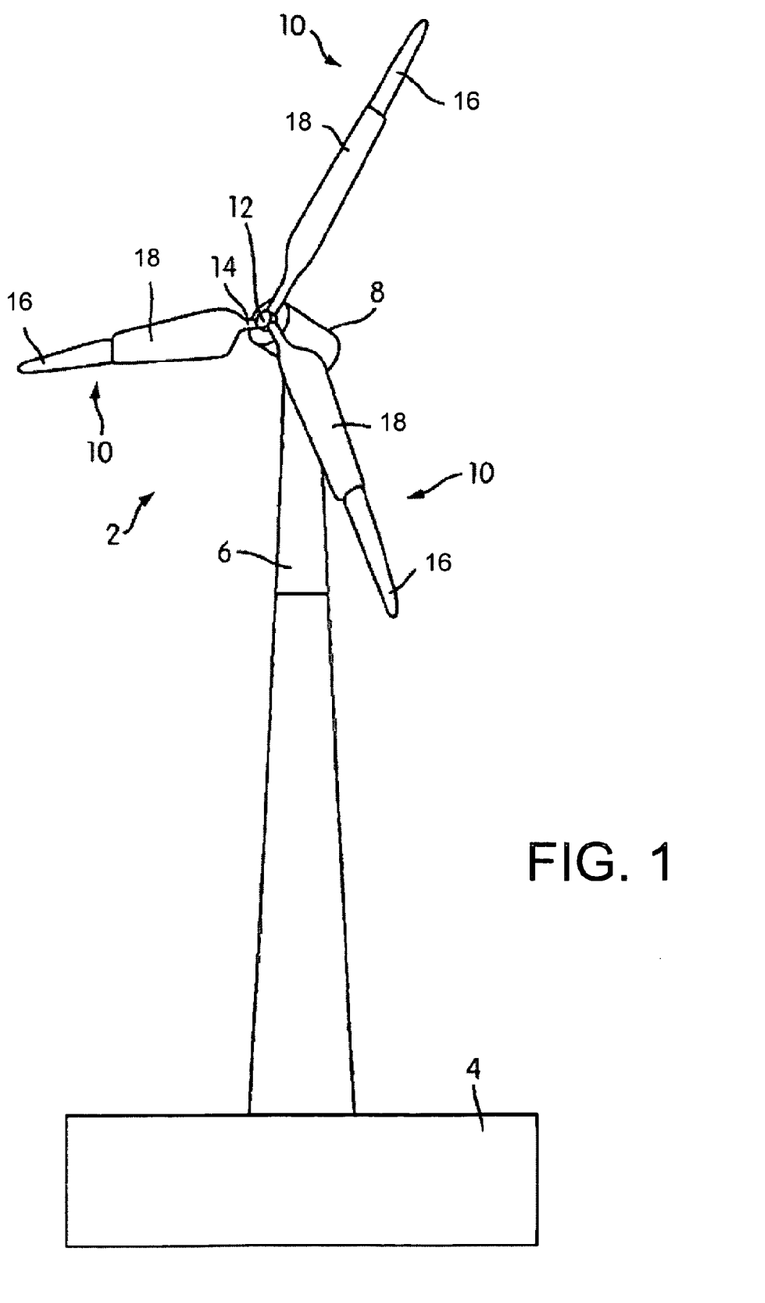
FIG. 1 illustrates an example wind turbine having a tower and multiple rotor blades according to one or more aspects described herein.

The invention disclosed herein entails several improvements to a variable length blade wind turbine design such as described in U.S. Pat. No. 6,902,370. FIG. 1 shows a wind turbine 2 on a foundation 4 with a tower 6 supporting a nacelle 8. Multiple blades 10 are attached to a hub 12 via a bolt flange 14. The hub 12 is connected to a drive train (not shown) within the nacelle 8. The blades 10 may be variable length blades having a root portion 18 and a tip portion 16. Sensors (not shown) may be attached to the tip portion 16. Some sensors that may be gainfully used in a wind turbine blade include: an accelerometer, a strain gauge, a pressure sensor, a proximity sensor (for avoiding tower strikes), a relative position sensor, a pilot tube and the like. Many other sensors, triggers, materials, and devices may be embedded in a wind turbine blade providing various utility as will be evident to one skilled in the art.

Figure 2:
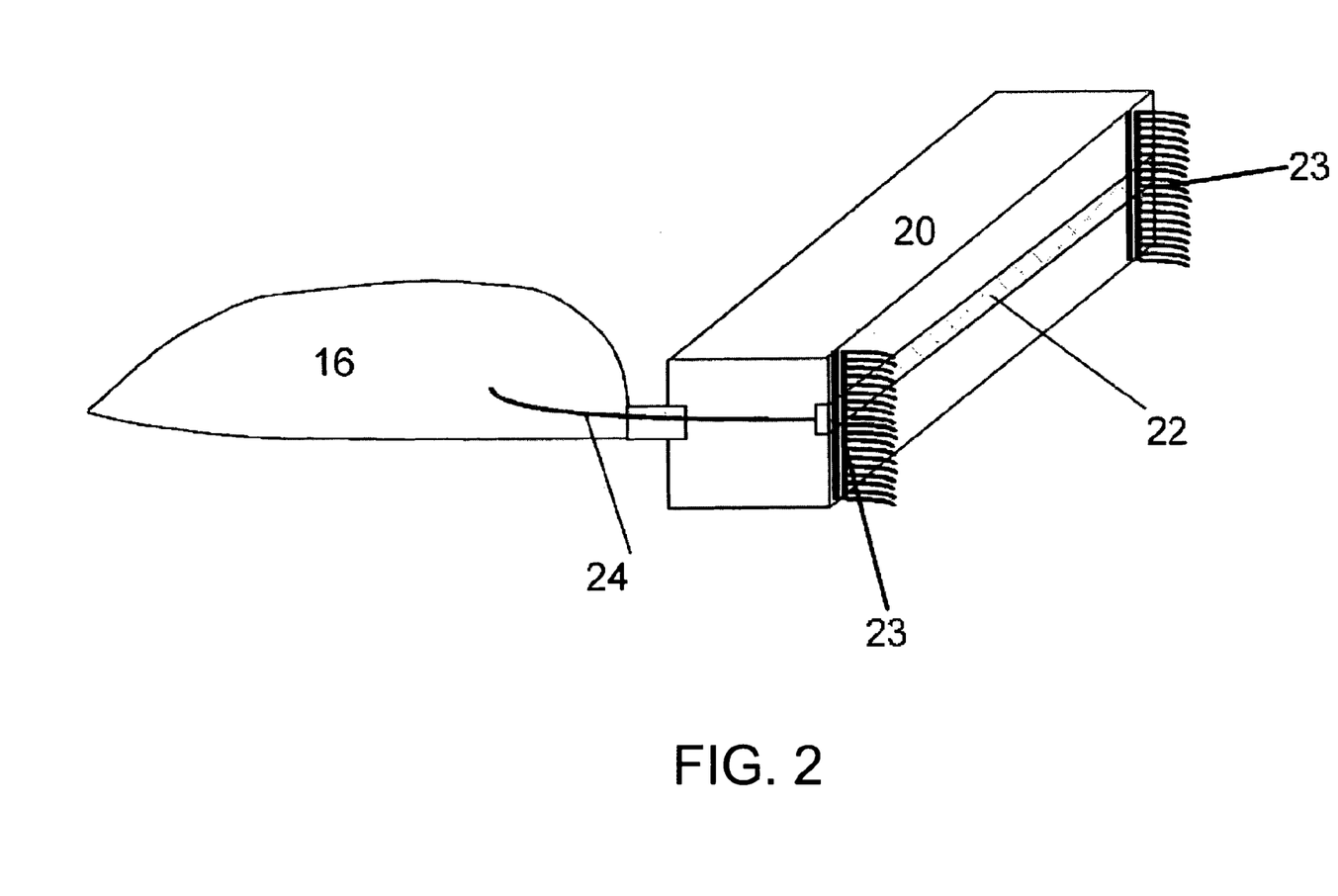
FIG. 2 illustrates an example blade tip attached to a slide block according to one or more aspects described herein.

FIG. 2 shows the tip portion 16 attached to a slide block 20. The tip portion 16 is not drawn to scale in order to show the detail in the connection portion. For example, the tip portion 16 will be many times larger than the slide block 20 as illustrated. In one or more arrangements, the slide block 20 is enclosed in a root portion (not shown) from which extendable tip portion 16 would extend. Slide block 20 includes a conductive strip 22 that may be constructed of graphite or other conductive materials. Conductive strip 22 may be secured within slide block 20 using various mechanisms including chemical adhesives and mechanical attachment systems. A wire 24 or another conductive element running from the conductive strip 22 into the tip portion 16 is used to transmit power and/or signals from a root portion to one or more components in blade tip 16 such as a sensor, a lighting element, motorized wind braking elements and the like. Wire 24 may be threaded through slide block 20 and into tip portion 16. Alternatively, wire 24 or portions thereof may run externally to slide block 20. In some instances, if graphite is used for the conductive strip 22, there is a likelihood of graphite dust build-up. To avoid this build-up, or the buildup of dirt that could foul the conductive strip 22, a brush 23 may be installed on the tip portion 18 to clear the graphite dust or dirt from a slide channel in which the slide block 20 is configured to move. The brush could be made of plastic, nylon, or another material. This would require less maintenance by personnel because brushes 23 located at the ends of the slide block 20 prevent dirt from fouling the conductive strip 22. The maintenance required may thus be limited to occasional replacement of the conductive strip 22 and/or the brushes 23 as the materials begin to wear. Because the speed of the movement is so slow, replacement should be rare.

Figure 3:
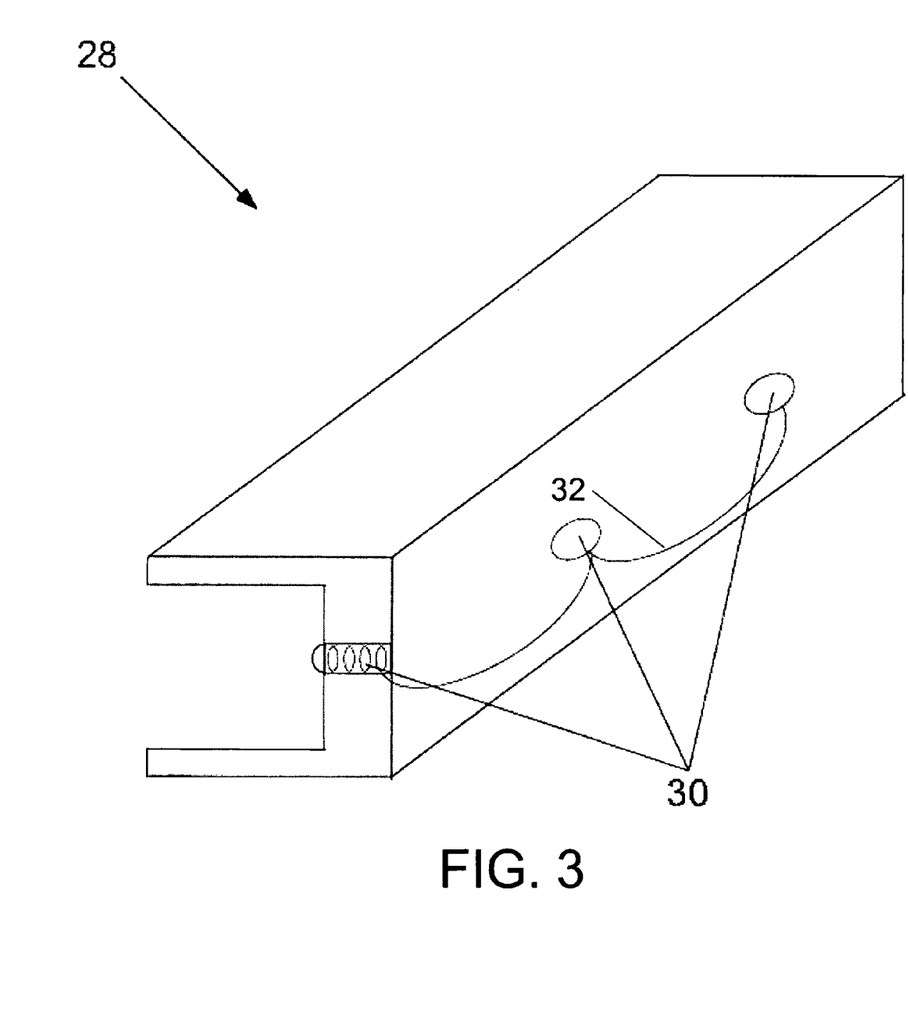
FIG. 3 illustrates an example slide channel with conductors according to one or more aspects described herein.
Figure 4:
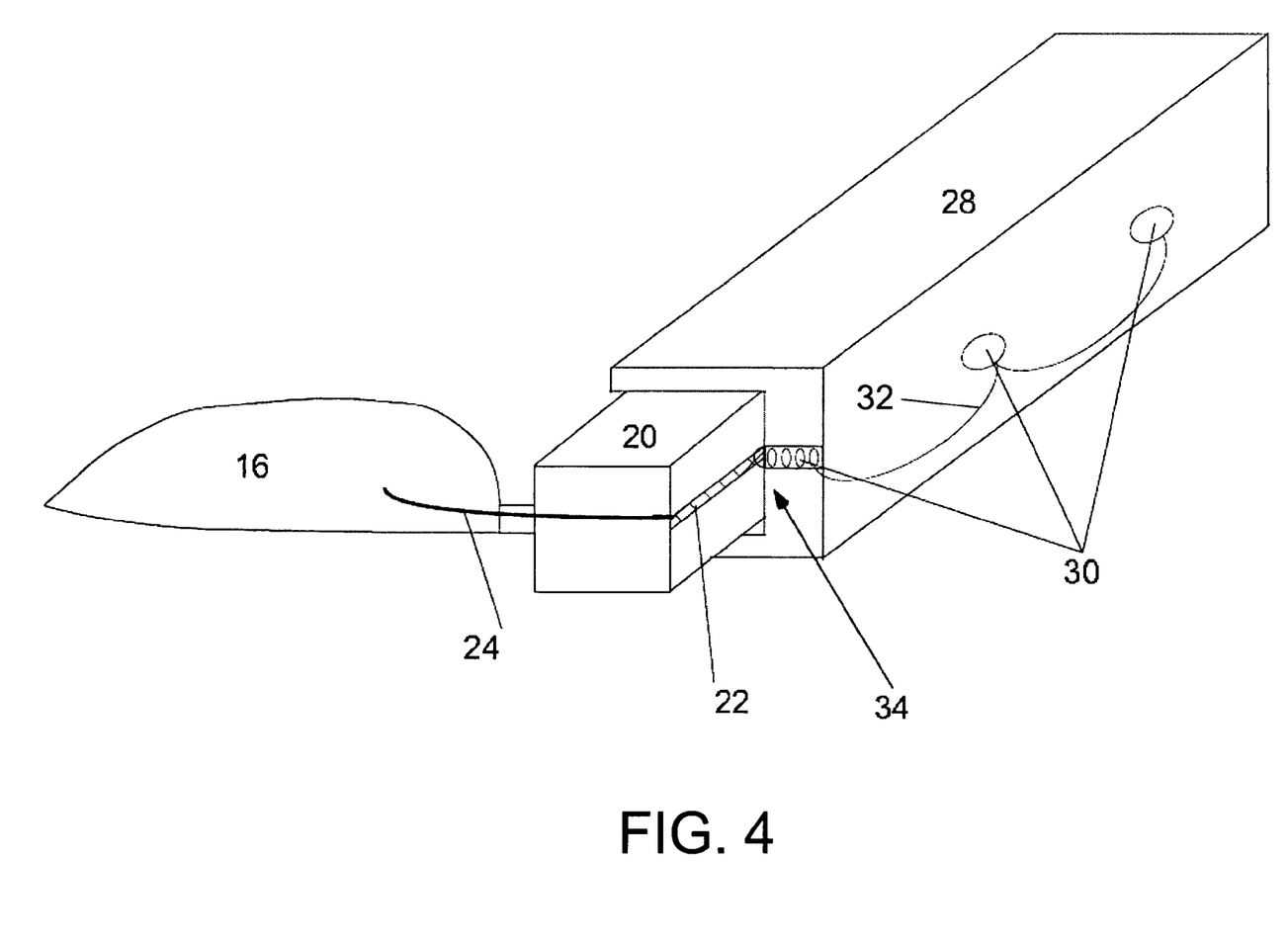
FIG. 4 illustrates an example slide block positioned within a slide channel during operation according to one or more aspects described herein.

As discussed, slide block 20 is configured to fit into a slide channel. FIGS. 3 and 4 illustrate such as slide channel, e.g., slide channel 28. As the tip portion 16 moves in relation to root portion 18 of blade 10, slide block 20 slides within slide channel 28. In one or more configurations, the slide channel 28 has spring-loaded buttons 30 embedded at intervals to insure that the slide block 20 and its conductive strip 22 are always in contact with one or more of the buttons 30. Thus, if there is a gap between slide block 20 and channel 28, conductivity can be maintained by having the buttons spring out to contact conductive strip 22. The buttons 30 may be made of brass, copper, carbon brushes or other conductive materials. The spacing of the conductive strip 22 and buttons 30 may vary depending on the configuration of slide block 20, slide channel 28 and the movement of slide block 20 in slide channel 28. Typically, the spacing between conductive strip 22 and buttons 30 and between each of buttons 30 may be defined such that contact of one or more buttons 30 with the conductive strip 22 is maintained throughout extension and retraction of a tip portion (e.g., tip portion 16 of FIG. 1). To transmit signal and/or power between buttons 30, a joining wire 32 may be used to connect each of buttons 30. One or more of buttons 30 may be connected to a power and/or signal source and thus may transmit signal and/or power to other buttons 30 through joining wire 32. Alternatively or additionally, a conductive wire or other element may run internally in slide block 28, forming connections between each of buttons 30. Because each of buttons 30 may be configured to transmit power and/or signals to conductive strip 22, an electrical connection between the tip portion 16, a root portion (e.g., root portion 18 of FIG. 6), and ultimately a turbine controller (not shown) may be maintained. In some configurations, conductive strip 22 may contact multiple buttons 30 at one time. While contact with a single one of buttons 30 may be sufficient, the contact of multiple buttons 30 may provide a failsafe so that if one of buttons 30 fails, signals and power may still be provided through the remaining buttons.

FIG. 4 shows the slide block 20 situated in the slide channel 28 during operation. As in other figures, the tip portion 16 is shown at reduced size to emphasize the slide block 20 and slide channel 28 mechanism. The spring-loaded buttons 30 are connected to power or controls from the turbine controller (not shown). The spring-loaded buttons 30 include an electrical contact point 34 with the conductive strip 22 in the slide block 20 providing power and signaling to the conductive strip 22. The wire 24 connected to conductive strip 22 then brings the power and signals from the slide block 20 into the tip portion 16. Once in the tip portion, wire 24 runs to various sensors or other mechanisms (not shown) so that power may be provided and signals may be transmitted or received. In one example, power may be provided through wire 24 to a light on tip portion 16. The light may be used to provide visibility to planes and other flying vehicles at night. In another example, signal and power may be provided through wire 24 to a braking element configured to protrude from a surface of tip portion 16 when activated. Wire 24 may be used to transmit a signal and provide the power to activate the extension of the braking element.

Under certain conditions, signals used in the wind turbine may be susceptible to distortion due to noise. In such environments, a filter may be used to compensate for the noise. Alternatively or additionally, signals may be wirelessly linked to a transceiver in the root portion 18 and the tip portion 16 to facilitate full duplex communication.

Figure 6:
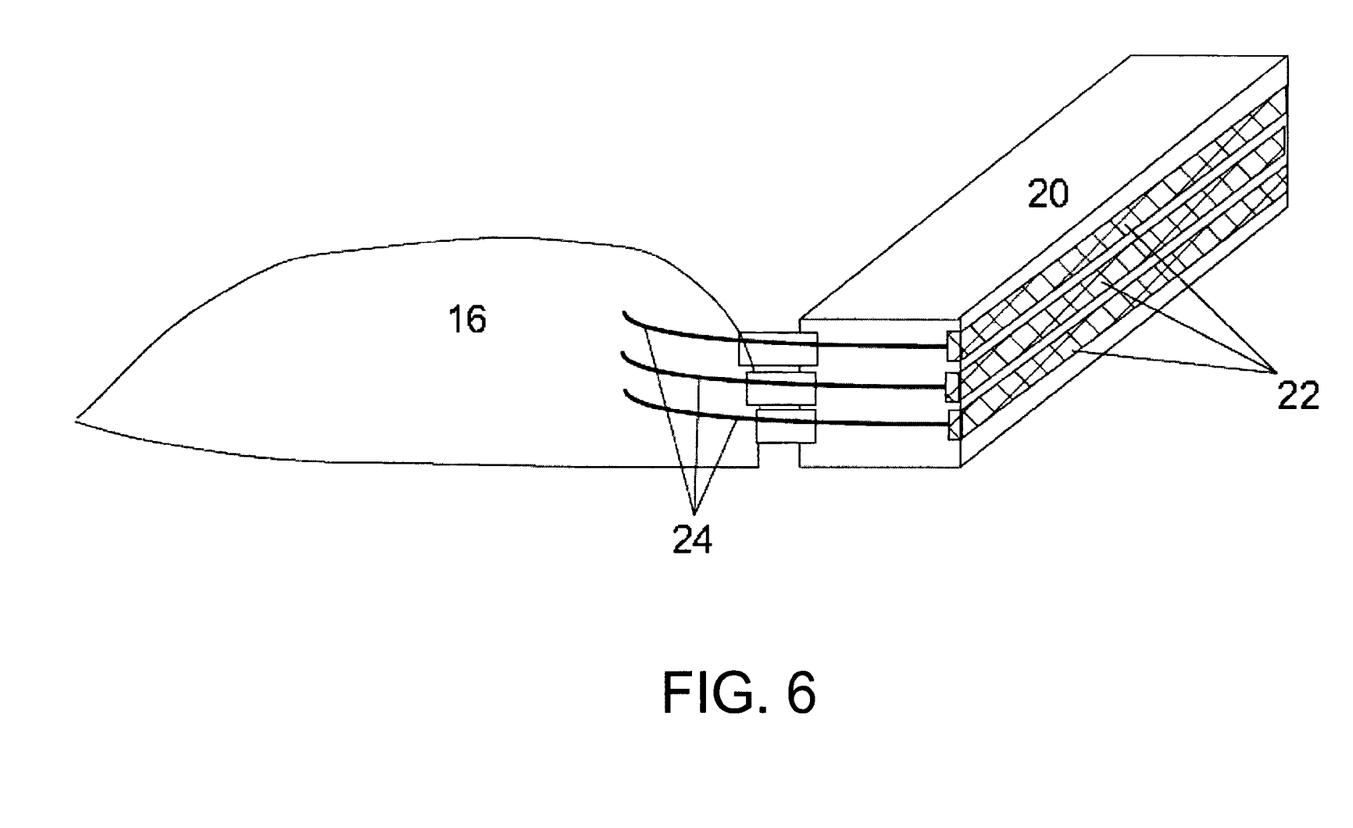
FIG. 6 illustrates an example slide block with multiple conductive elements according to one or more aspects described herein.

Alternatively, buttons 30 may be located on the slide block 20 and the conductive strip 22 may be disposed on the slide channel 28. Thus, buttons 30 may be configured to spring forward from slide block 20 to make contact with conductive strip 22 in slide channel 28. Alternatively or additionally, multiple conductive strips 22 and buttons 30 may be used to carry multiple signals or power supplies in parallel. Many variations of this design could be used to power or carry signals for many different uses. A design using multiple conductive strips 22 is shown in FIG. 6. Conductive strips 22 may run in parallel along slide block 20. Separate wires 24 may then extend from each of conductive strips 22 to provide power and signaling to various sensors, lights and other mechanisms within tip portion 16. Alternatively, multiple wires 24 may run to the same device if extra power is needed to run a mechanism or device within tip portion 16.

Figure 7:
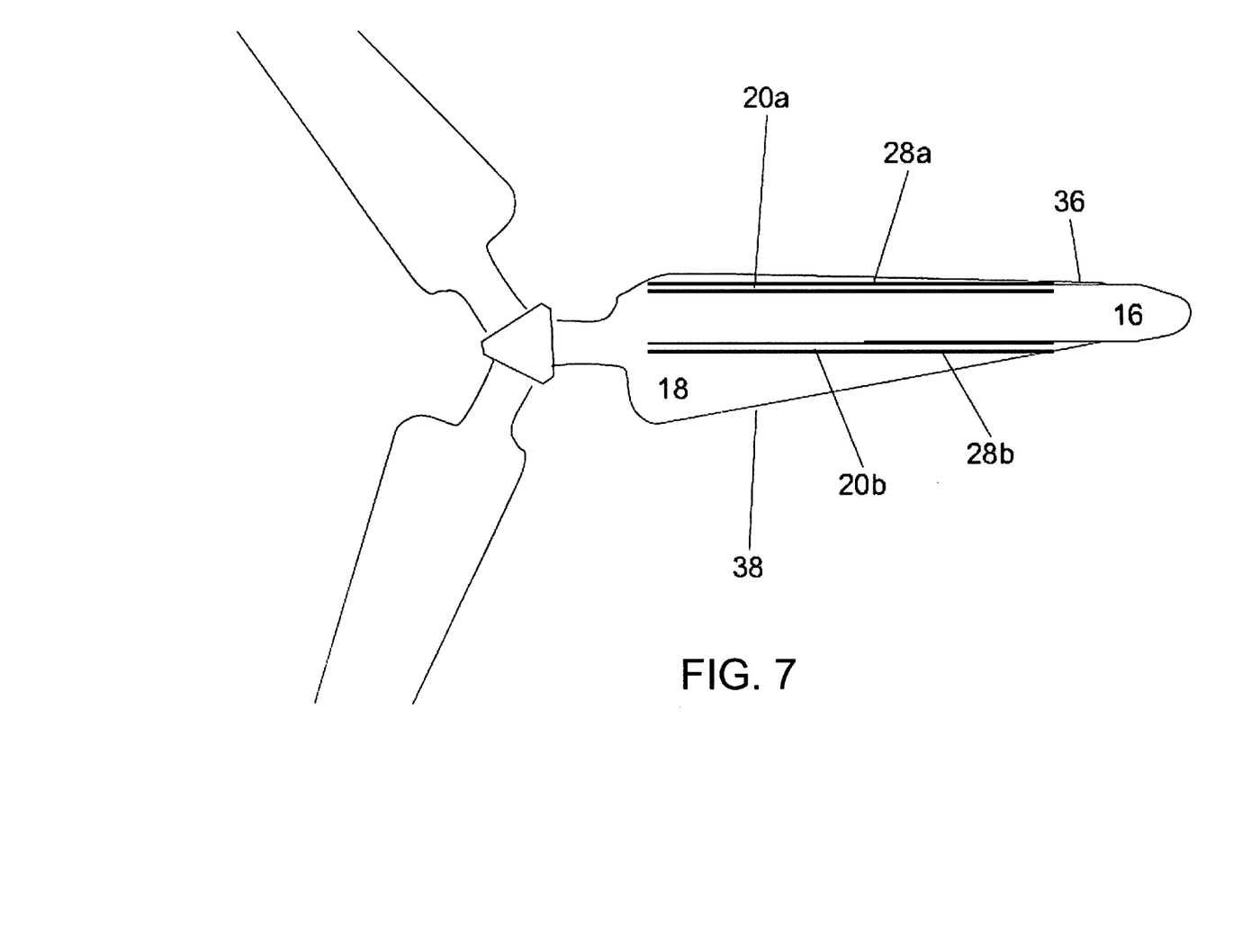
FIG. 7 illustrates an example configuration of a wind turbine blade using the slide block and channel mechanism to transmit power and signals to a tip portion of the blade according to one or more aspects described herein.

In one or more arrangements where multiple conductive strips are used in an extendable rotor blade, each conductive strip may have or be connected using multiple wires. These wires may be configured to not contact each other so that signals are not crossed or diluted and power is not inadvertently transferred to the wrong components. In order to eliminate the possibility of contact, separate sets of slide blocks 20 and slide channels 28 may be located in different areas of the blade 10. For instance, as shown in FIG. 7, a slide block 20*a* and slide channel 28*a* may connect the positive end of a power supply on the leading edge 36 of a blade, and a slide block 20*b* and slide channel 28*b* may connect the negative end of a power supply on the trailing edge 38 of the blade.

By using a channel such as slide block 20 and slide channel 28 to carry power and signals, the difficulty of running wires from a root portion of an extendable rotor blade to a tip portion may be eliminated. When power is needed to run motors to extend the blades, instead of a loose wire which may be caught in a retraction mechanism, power may be provided using conductive strips (e.g., conductive strip 22) and buttons or contacts (e.g., buttons 30). In contrast to loose wires which may have significant play, conductive strips and buttons or contacts may be static in slide block 20 and slide channel 28, respectively. Stated differently, conductive strips like strip 22 and buttons or contact such as buttons 30 might be restricted from movement by virtue of being integrated into slide block 20 and slide channel 28, respectively. Since buttons 30 remain stationary during retraction and extension, wires such as the wires connecting each of buttons 30 would not need to stretch or retract. This will increase turbine reliability and operation time.

Figure 5:
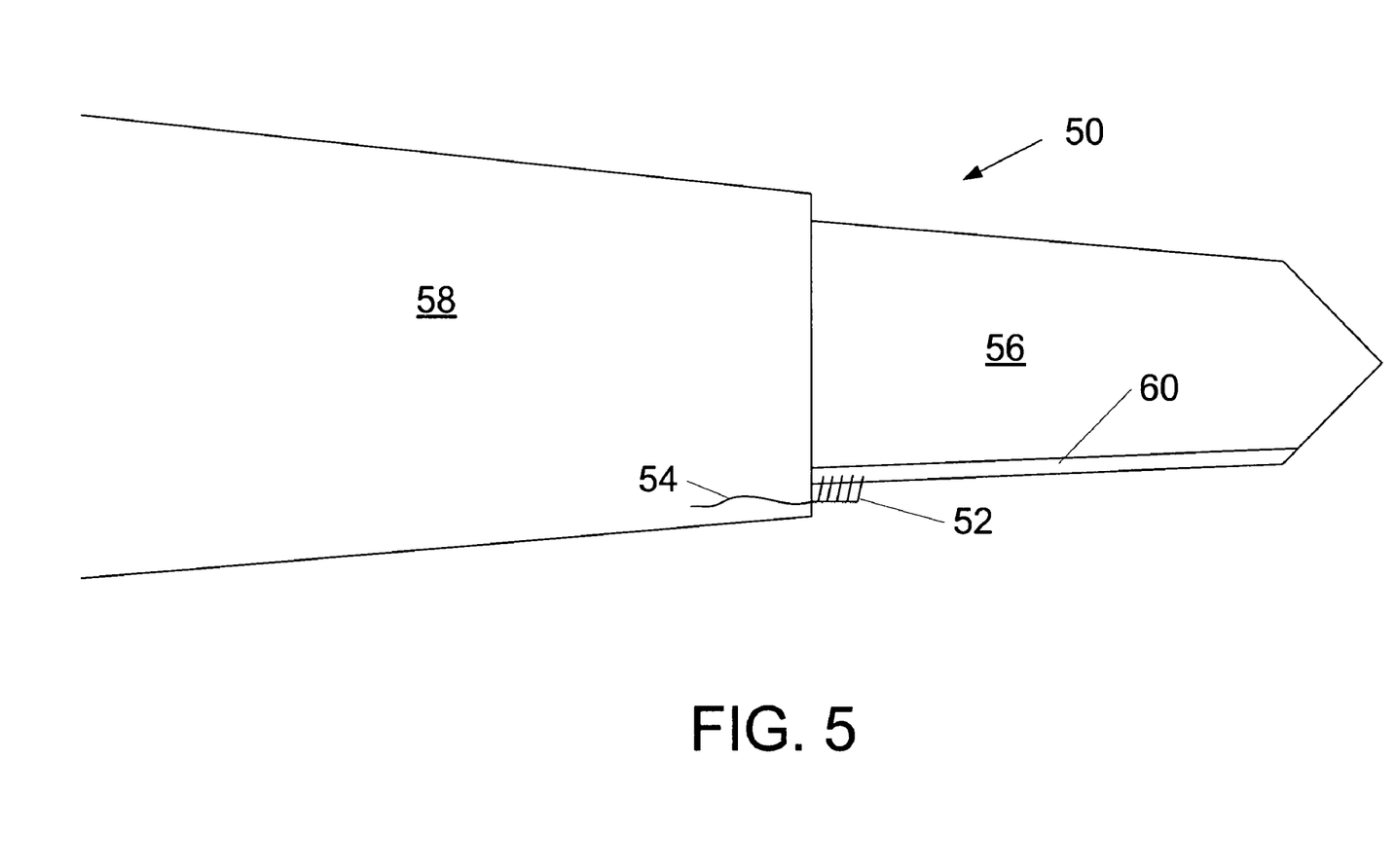
FIG. 5 illustrates an example extendable rotor blade including a conductive brush and an extendable tip portion having a conductive surface in contact with the conductive brush according to one or more aspects described herein.

In some arrangements, lightning may be a concern because the tall towers are vulnerable to lightning strikes. Accordingly, a rotor blade and turbine may include protections to avoid lightning damage to turbine components. One method and system to prevent lightning from following signal or power conductors is to keep the lightning on the outside of the blade using a conductive surface 60 on the tip portion 56 of blade 50 as illustrated in FIG. 5. The conductive surface 60 can be made of metallic tape, an embedded conductive mesh, a conductive coating, or other conductive material. A contact brush 52, attached to the root portion 58 contacts and slides along the conductive surface 60, creating a conductive path to the conductor 54, which carries current to ground. Such a configuration may keep all lightning away from any of the internal mechanisms in the blade 50. Other methods of lightning damage avoidance may also be used. The brush 52 further provides a cleaning element to remove dust and other debris from conductive surface 50.

The disclosed invention is not limited by the above description and many variations of the above disclosed innovations will be evident to one skilled in the art.

Additionally, the methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. An extendable rotor blade comprising:
a slide channel including a first conductive element;
a tip portion configured to extend and retract; and
a slide block including a second conductive element, wherein the tip portion is connected to the slide block and wherein the slide block is configured to fit within the slide channel such that the second conductive element contacts the first conductive element,
wherein the extendable rotor blade is configured to transmit at least one of power and signals from one of the first conductive element and the second conductive element to the other one of the first conductive element and the second conductive element through contact between the first and second conductive elements.

2. The extendable rotor blade of claim 1, wherein the slide channel is connected to a root portion of the extendable rotor blade.

3. The extendable rotor blade of claim 1, wherein the tip portion includes at least one electrical device and a wire connecting the at least one electrical device to the second conductive element.

4. The extendable rotor blade of claim 1, wherein the slide block further includes a cleaning element configured to remove particles from the slide channel.

5. An extendable rotor blade comprising:
a slide channel including a first conductive element;
a tip portion configured to extend and retract; and
a slide block including a second conductive element, wherein the tip portion is connected to the slide block and wherein the slide block is configured to fit within the slide channel such that the second conductive element contacts the first conductive element, wherein the first conductive element includes a fixed spring-loaded electrical contact.

6. An extendable rotor blade comprising:
a slide channel including a first conductive element;
a tip portion configured to extend and retract; and
a slide block including a second conductive element, wherein the tip portion is connected to the slide block and wherein the slide block is configured to fit within the slide channel such that the second conductive element contacts the first conductive element, wherein the second conductive element includes a fixed conductive strip embedded in the slide block.

7. An apparatus comprising:
an extendable turbine blade tip including an electrical component; and
a slide block attached to the extendable blade tip, wherein the slide block includes a fixed conductive element on a surface of the slide block and wherein the fixed conductive element is connected to the electrical component,
wherein the fixed conductive element extends the length of the slide block, and
wherein the fixed conductive element is a conductive strip embedded in the slide block.

8. The apparatus of claim 7, wherein the slide block is disposed within a slide channel attached to a root portion of an extendable turbine blade.

9. The apparatus of claim 7, wherein the slide block includes a plurality of distinct conductive elements.

10. The apparatus of claim 9, wherein each of the plurality of distinct conductive elements is connected to a different electrical device in the extendable blade tip.

11. An extendable rotor blade comprising:
a slide channel including a first conductive element; and
a slide block disposed within the slide channel such that a second conductive element is in contact with the first conductive element and wherein the slide block includes a cleaning element located on a surface of the slide block facing the slide channel,
wherein the extendable rotor blade is configured to transmit at least one of power and signals from one of the first conductive element and the second conductive element to the other one of the first conductive element and the second conductive element through contact between the first and second conductive elements.

12. The extendable rotor blade of claim 11, wherein the second conductive element is exposed on the surface of the slide block facing the slide channel.

13. The extendable rotor blade of claim 11, wherein the first conductive element is outwardly biased.

14. The extendable rotor blade of claim 11, wherein the slide channel is attached to an extendable blade tip of the extendable rotor blade.

15. The extendable rotor blade of claim 14, wherein the slide block is attached to a root portion of the extendable rotor blade.

16. An extendable rotor blade comprising:
a root portion of the extendable rotor blade;
a tip portion configured to extend and retract from the root portion, the tip portion including an electrically conductive outer surface; and
an electrically conductive brush attached to said root portion, the electrically conductive brush in sliding contact with said conductive outer surface of said tip portion, thereby forming an electrical connection between the tip portion and the root portion of the extendable rotor blade.

17. The extendable rotor blade of claim 16, wherein the electrically conductive brush is configured to clean the electrically conductive outer surface of the tip portion as the tip portion retracts into the root portion.

* * * * *